(12) United States Patent
Gill

(10) Patent No.: US 8,892,145 B2
(45) Date of Patent: Nov. 18, 2014

(54) SYSTEM AND METHOD FOR SELECTIVE MEDIA OBJECT REMOVAL IN GROUP COMMUNICATIONS AMONG WIRELESS COMMUNICATION DEVICES

(75) Inventor: Harleen K. Gill, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1125 days.

(21) Appl. No.: 12/708,245

(22) Filed: Feb. 18, 2010

(65) Prior Publication Data

US 2011/0201375 A1 Aug. 18, 2011

(51) Int. Cl.
| | | |
|---|---|---|
| H04B 7/00 | (2006.01) | |
| H04L 12/18 | (2006.01) | |
| H04W 76/00 | (2009.01) | |
| H04W 4/08 | (2009.01) | |
| H04W 8/18 | (2009.01) | |
| H04L 12/58 | (2006.01) | |
| H04W 4/18 | (2009.01) | |

(52) U.S. Cl.
CPC .......... *H04L 12/189* (2013.01); *H04W 76/005* (2013.01); *H04L 12/587* (2013.01); *H04W 4/08* (2013.01); *H04L 51/063* (2013.01); *H04L 12/583* (2013.01); *H04W 4/18* (2013.01); *H04W 8/186* (2013.01)
USPC .......................................... 455/518; 455/519

(58) Field of Classification Search
USPC ........................................................ 455/518
See application file for complete search history.

(56) References Cited

U.S. PATENT DOCUMENTS

| | | |
|---|---|---|
| 7,231,206 B2 | 6/2007 | Cudak et al. |
| 7,689,510 B2 | 3/2010 | Lamkin et al. |
| 7,779,097 B2 | 8/2010 | Lamkin et al. |
| 8,195,213 B2 | 6/2012 | Maggenti et al. |

(Continued)

FOREIGN PATENT DOCUMENTS

| | | |
|---|---|---|
| EP | 1480439 A1 | 11/2004 |
| EP | 1575316 A2 | 9/2005 |

(Continued)

OTHER PUBLICATIONS

International Search Report and Written Opinion—PCT/US2011/024361, ISA/EPO—May 10, 2011.

(Continued)

*Primary Examiner* — Ajibola Akinyemi
(74) *Attorney, Agent, or Firm* — Raphael Freiwirth

(57) ABSTRACT

A system and method for selectively removing a media object from a group communication that includes media that may not be accessible or executable by all target members of the group. The group communication can have one or more discrete media objects that are sent from an originating wireless communication device across a wireless communication network and received at a group communication server that controls group communications between a group of member wireless communication devices and determines the media-handling capability of the target wireless communication device members of the communication group. Upon a determination that a media object sent is unable to be handled by at least one target wireless communication device, the group communication server removes the one or more media objects notifies the originating wireless communication device and/or that target wireless communication device of the removal of the media object.

29 Claims, 5 Drawing Sheets

(56) References Cited

U.S. PATENT DOCUMENTS

| | | |
|---|---|---|
| 8,365,060 B2 | 1/2013 | Wang et al. |
| 2002/0049844 A1 | 4/2002 | Nishikawa |
| 2002/0086665 A1 | 7/2002 | Maggenti et al. |
| 2002/0103999 A1 | 8/2002 | Camnisch et al. |
| 2003/0153341 A1 | 8/2003 | Crockett et al. |
| 2003/0217118 A1 | 11/2003 | Kobayashi et al. |
| 2004/0030995 A1 | 2/2004 | Bhogal et al. |
| 2004/0128324 A1 | 7/2004 | Sheynman et al. |
| 2004/0190468 A1 | 9/2004 | Saijonmaa |
| 2004/0236768 A1 | 11/2004 | Saito |
| 2005/0041625 A1 | 2/2005 | Brewer |
| 2005/0124365 A1 | 6/2005 | Balasuriya et al. |
| 2005/0172127 A1 | 8/2005 | Hartung et al. |
| 2005/0287982 A1 | 12/2005 | Brewer et al. |
| 2006/0023747 A1 | 2/2006 | Koren et al. |
| 2006/0026119 A1 | 2/2006 | Mirrashidi et al. |
| 2006/0031309 A1 | 2/2006 | Luoffo et al. |
| 2006/0046760 A1 | 3/2006 | Bertino et al. |
| 2006/0052127 A1 | 3/2006 | Wolter |
| 2006/0073843 A1 | 4/2006 | Aerrabotu et al. |
| 2006/0075455 A1 | 4/2006 | Koch et al. |
| 2006/0120308 A1 | 6/2006 | Forbes et al. |
| 2006/0168640 A1 | 7/2006 | Anttila et al. |
| 2006/0171338 A1 | 8/2006 | Lim |
| 2006/0221968 A1 | 10/2006 | Razdan et al. |
| 2006/0229015 A1 | 10/2006 | Park et al. |
| 2006/0271636 A1 | 11/2006 | Balasuriya |
| 2007/0002836 A1 | 1/2007 | Lindner |
| 2007/0008830 A1 | 1/2007 | Tsukazaki et al. |
| 2007/0011256 A1 | 1/2007 | Klein |
| 2007/0016613 A1 | 1/2007 | Foresti et al. |
| 2007/0021137 A1 | 1/2007 | Kokkonen et al. |
| 2007/0049314 A1 | 3/2007 | Balachandran et al. |
| 2007/0054687 A1 | 3/2007 | Akita et al. |
| 2007/0071210 A1 | 3/2007 | Schmidt et al. |
| 2007/0076660 A1 | 4/2007 | Sung et al. |
| 2007/0168419 A1 | 7/2007 | Sciammarella |
| 2007/0195735 A1 | 8/2007 | Rosen et al. |
| 2007/0208802 A1 | 9/2007 | Barman et al. |
| 2007/0216761 A1 | 9/2007 | Gronner et al. |
| 2008/0005247 A9 | 1/2008 | Khoo |
| 2008/0071875 A1 | 3/2008 | Koff et al. |
| 2008/0091804 A1 | 4/2008 | Swanburg et al. |
| 2008/0096597 A1 | 4/2008 | Vempati et al. |
| 2008/0136897 A1 | 6/2008 | Morishima et al. |
| 2008/0242222 A1 | 10/2008 | Bryce et al. |
| 2008/0250100 A1 | 10/2008 | Hatanaka et al. |
| 2008/0313342 A1 | 12/2008 | Wu |
| 2008/0318610 A1* | 12/2008 | Bhaskaran et al. ........... 455/518 |
| 2009/0028049 A1 | 1/2009 | Boudreau et al. |
| 2009/0088191 A1 | 4/2009 | Norton et al. |
| 2009/0106389 A1 | 4/2009 | Hakkarainen et al. |
| 2009/0197652 A1 | 8/2009 | Lundstrom et al. |
| 2010/0013905 A1 | 1/2010 | Kumar et al. |
| 2010/0020745 A1 | 1/2010 | Agulnik et al. |
| 2010/0076946 A1 | 3/2010 | Barker et al. |
| 2010/0153395 A1 | 6/2010 | Hannuksela et al. |
| 2010/0190478 A1 | 7/2010 | Brewer et al. |
| 2010/0195578 A1 | 8/2010 | Razdan et al. |
| 2010/0281041 A1 | 11/2010 | Almeida |
| 2010/0332994 A1 | 12/2010 | Istvan et al. |
| 2011/0055935 A1 | 3/2011 | Karaoguz et al. |
| 2012/0015675 A1 | 1/2012 | Suetsugu et al. |
| 2012/0020238 A1 | 1/2012 | Suetsugu et al. |
| 2013/0040686 A1 | 2/2013 | Bhaskaran et al. |
| 2013/0040687 A1 | 2/2013 | Bhaskaran et al. |
| 2013/0084912 A1 | 4/2013 | Lindner et al. |
| 2013/0110954 A1 | 5/2013 | Barman et al. |
| 2013/0110956 A1 | 5/2013 | Barman et al. |
| 2013/0122872 A1 | 5/2013 | Brewer et al. |
| 2013/0122955 A1 | 5/2013 | Brewer et al. |
| 2013/0218995 A1 | 8/2013 | Barman et al. |
| 2014/0112244 A1 | 4/2014 | Lindner et al. |

FOREIGN PATENT DOCUMENTS

| | | |
|---|---|---|
| EP | 1708428 A1 | 10/2006 |
| EP | 1781049 A1 | 5/2007 |
| EP | 1860907 A1 | 11/2007 |
| EP | 1863198 A1 | 12/2007 |
| EP | 2391074 | 11/2011 |
| GB | 2405768 | 3/2005 |
| GB | 2413730 A | 11/2005 |
| JP | 10322454 A | 12/1998 |
| JP | 2000115253 A | 4/2000 |
| JP | 2002189870 A | 7/2002 |
| JP | 2003086233 A | 3/2003 |
| JP | 2004348268 A | 12/2004 |
| JP | 2005512357 A | 4/2005 |
| JP | 2005514804 A | 5/2005 |
| JP | 2006004190 A | 1/2006 |
| JP | 2006514359 A | 4/2006 |
| JP | 2006191631 A | 7/2006 |
| JP | 2007067995 A | 3/2007 |
| JP | 2007124417 A | 5/2007 |
| JP | 2007148659 A | 6/2007 |
| JP | 2007258851 A | 10/2007 |
| JP | 2009514290 A | 4/2009 |
| JP | 2009516464 A | 4/2009 |
| JP | 2009516981 A | 4/2009 |
| WO | 0293954 A1 | 11/2002 |
| WO | 03026138 A2 | 3/2003 |
| WO | 03069947 A1 | 8/2003 |
| WO | 2004061571 A2 | 7/2004 |
| WO | 2004086715 | 10/2004 |
| WO | 2006059206 A1 | 6/2006 |
| WO | 2006127168 A1 | 11/2006 |
| WO | 2007005971 | 1/2007 |
| WO | 2007020685 A1 | 2/2007 |
| WO | 2007048793 A2 | 5/2007 |
| WO | 2007058469 A1 | 5/2007 |
| WO | 2007061234 A1 | 5/2007 |
| WO | 2008087742 A1 | 7/2008 |

OTHER PUBLICATIONS

Martin G.M., et al "A Mechanism to Enable File Transfer with the Session Initiation Protocol (SIP); draft-garcia-sipping-file-transfer-mech-OO .txt" IETF Standard-Working-Draft, Internet Engineering Task Force, IETF, CH, Feb. 23, 2006, pp. 1-20, XP015043461 p. 3-p. 9.

Vatsa R., et al., "Role of media transformation in multimedia messaging", IEEE, pp. 258-262, 2005.

Anonymous: "Sending Places and Group Icons", WhatsApp Blog, Jan. 2, 2013, pp. 1-5, XP055103982, Retrieved from the Internet: URL: http://web.archive.org/web/20130102005856/http://blog.whatsapp. com/index.php/2012/03/sending-places-and-group-icons/ [retrieved on Feb. 24, 2014] the whole document.

* cited by examiner

SYSTEM AND METHOD FOR SELECTIVE MEDIA OBJECT REMOVAL IN GROUP COMMUNICATIONS AMONG WIRELESS COMMUNICATION DEVICES

BACKGROUND

The present invention relates to point-to-point or point-to-multipoint wireless communications systems. More specifically, the present invention relates to systems and methods for removal of a media object from a group communication between wireless telecommunication devices that a target user is unable to handle, and notification is given to that target user of the media object removal.

In wireless telecommunication devices, such as cellular phones, PDAs, mini-laptops, and advanced pagers, the devices typically communicate over long distances by bridging telephone calls through existing cellular telephone networks and passing data packets across the network. These wireless devices can have limited or significant data processing and computing capability, and can accordingly send and receive software programs, in addition to voice, across the telephone network.

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier and the PTT communications are mediated by one or more group communication control devices on the wireless communication network. The member devices of the communication group are known to the group communication control devices.

A PTT communication connection is typically initiated by a single button-push on the wireless device that activates a half-duplex link between the speaker and each member device of the group and once the button is released, the device can receive incoming PTT transmissions. Existing PTT systems have advantages over traditional cellular systems because they have faster call setup times, e.g., setup times ideally in the range of 1 second as opposed to cellular voice channels that can take more than 5 seconds to establish. In some arrangements, the PTT speaker will have the "floor" where no other group member can speak while the speaker is speaking. Once the speaker releases the PTT button, any other individual member of the group can engage their PTT button and they will have the floor. Generally speaking, the PTT system uses standard voice-over internet protocol (VoIP) technologies. Voice information is sent in digital form over IP-based data networks. In PTT scenarios, instead of using the standard cellular infrastructure a call is formed by combining separate point-to-point connections between each IP endpoint at a server. Initiating the PTT system generates a call to the target device. The call originator's voice can be sent through the carrier's network to the target handset.

In existing PTT systems, member devices typically only communicate voice data between the devices during a communication session. It is difficult to include other data or media in a group communication because of the size of the data and the device resources necessary to handle non-voice data, and the unknown capability of the target devices to handle the media. A mobile device that therefore desires to send non-voice data, such as media objects, must typically do so through specific data traffic channels established between the device and a wireless communication network, and not the channels supporting group communications, such as PTT voice calls.

Accordingly, it would be advantageous to provide a system and method for a mobile device to attempt to send any media object in a group communication to other members of a communication group, such as during a PTT communication session, without concern that a target device may be unable to handle the media object. It is thus to such a system and method that the present invention is primarily directed.

SUMMARY

Briefly described, the present invention is for a system and method that selectively removes a media object from a group communication, such as PTT calls, that can include media that may not be accessible or executable by all target members wireless communication devices of the group. The group communication can have one or more media objects that are sent from an originating wireless communication device across the wireless communication network and received at a group communication server that controls group communications between a group of member wireless communication devices, and the group communication server is aware of the media-handling capability of the target one or more wireless communication device members of the communication group. Upon a determination that a media object sent is unable to be handled by at least one target wireless communication device, the group communication server removes the media object containing the one or more media objects for that target wireless communication device and then notifies that target wireless communication device of the removal of the media object. The removed media object can be placed at another location that will be accessible to the target wireless communication device should it ultimately be able to handle the media object.

In one embodiment, the system for selectively removing one or more media objects from a group communication from an originating wireless communication device and one or more target wireless communication devices across a wireless communication network, including an originating wireless telecommunication device configured to selectively send a group communication to one or more target wireless communication devices across a wireless communication network, where the group communication includes one or more discrete media objects therein. There is a group communication server on the wireless network that is configured to control group communications between a group of member wireless communication devices, and determine the media-handling capability of one or more wireless communication device members of a communication group. Upon a determination that a media object sent from an originating wireless communication device to at least one target wireless communication device is unable to be handled by the at least one target wireless communication device, the group communication server will remove the one or more media objects from the group communication that the target device cannot handle and notify the at least one target wireless communication device of the removal of the one or more media objects.

In one embodiment, the method for selectively removing one or more media objects from a group communication from an originating wireless communication device and one or more target wireless communication devices across a wireless communication network including the steps of sending a group communication from an originating wireless communication device to one or more target wireless communication devices across a wireless communication network, where the group communication includes one or more discrete media objects. Then the method has the steps of receiving the group communication at a group communication server that controls group communications between a group of member wireless communication devices, determining the media-handling capability of one or more target wireless communication device members of a communication group, and upon a determination that a media object sent from an originating wireless communication device to at least one target wireless communication device is unable to be handled by the at least one target wireless communication device, the group communication server removes the one or more media objects from the group communication and notifies the at least one target wireless communication device of the removal of the one or more media objects.

The present invention is therefore advantageous as it provides a system and method that allows a wireless communication device to send a media object within a group communication, or along with other group communications, without concern as to whether the target can actually handle the media object. The mediating group communication server(s) can determine if a target wireless communication device is able to handle the media object and remove one or more media objects and notify the target device of the removal of the one or more media objects. In addition, in one embodiment, the group communication server can provide access to or information on accessing the removed object to the target device such that future access to the removed media object may be possible, such as through a hyperlink or web address.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

In this disclosure, the terms 'communication device,' 'wireless device,' 'wireless communications device,' 'PTT communication device,' 'handheld device,' 'mobile device,' and 'handset' are used interchangeably. The terms 'call' and 'communication' are also used interchangeably. The term 'exemplary' means that the disclosed element or embodiment is only an example, and does not indicate any preference of user. The term 'group communication' encompasses a one-to-one or one-to-many half-duplex communication, or can be a virtual half-duplex communication in a full-duplex communication channel. Further, like numerals refer to like elements throughout the several drawings, and the articles "a" and "the" include plural references, unless otherwise specified in the description.

The term 'circuitry' used through the disclosure can include specialized computer circuits that embody logic operable to perform function(s). In other instances, the term 'circuitry' can include a general purpose processing unit that can be configured by software instructions that embody logic operable to perform function(s). In this example, an implementer may write source code embodying logic that can be compiled into machine readable code. The compiled code can then be processed by the general purpose processing unit thereby transforming the general purpose processing unit into a special purpose processor. One skilled in the art can appreciate that the state of the art has evolved to a point where there is little difference between hardware, software, and a combination of hardware/software, and the selection of hardware versus software is a design choice left to an implementer. More specifically, one of skill in the art can appreciate that a software process can be transformed into an equivalent hardware circuit, and a hardware circuit can itself be transformed into an equivalent software process.

Figure 1:
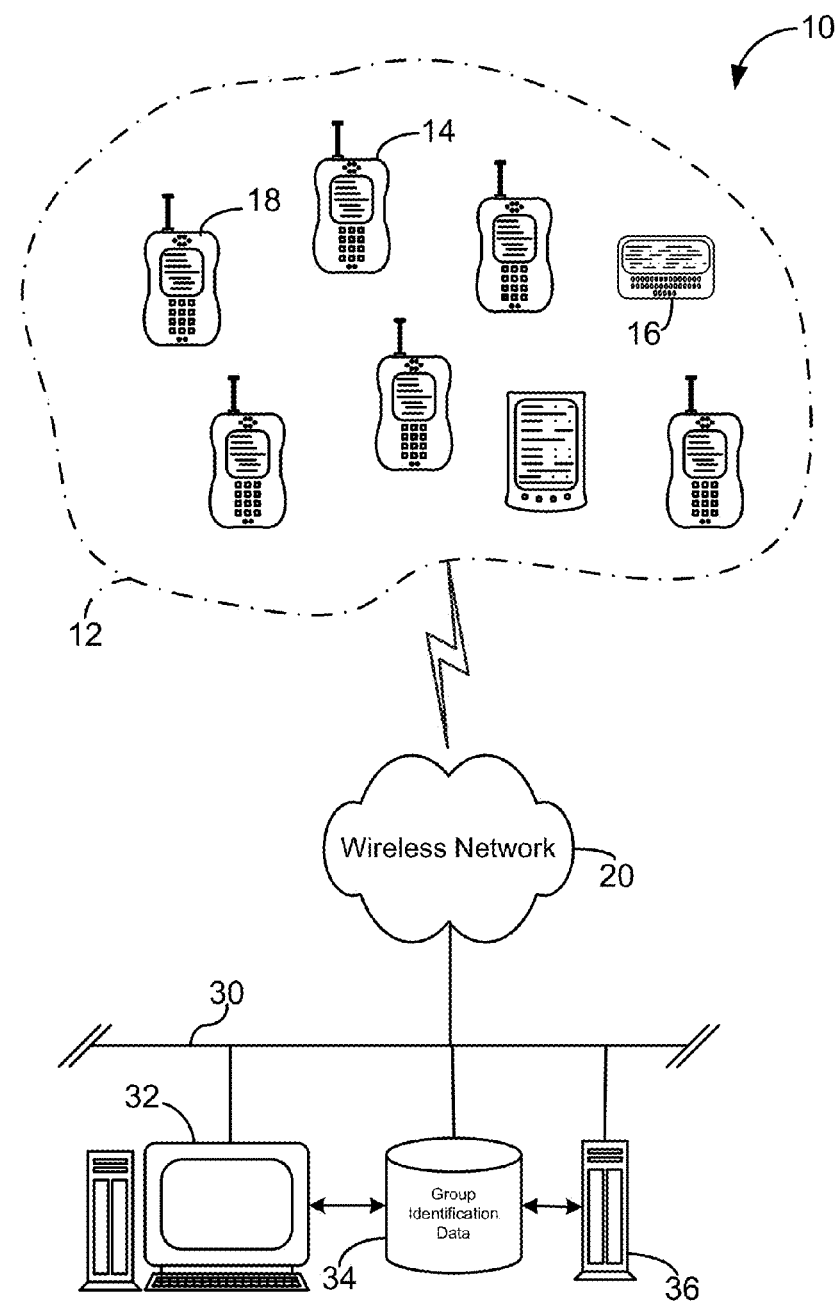
FIG. 1 illustrates an exemplary operational environment for practicing aspects of the present disclosure.

FIG. 1 illustrates an example embodiment of a system 10 for sharing media objects and media objects among one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 can be capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) will conduct group communications through, at least the group communication computer device, shown here as server 32, which is present on a server-side LAN 30 across the wireless network 20. The group communication computer device 32 can determine that the wireless device is present, i.e. accessible, on the wireless network 20 and share this information with a set of target wireless telecommunication devices designated by the first wireless telecommunication device or it can also share this with other computer devices resident on the server-side LAN 30 or accessible across the wireless network 20. The group communication computer device 32 can have an attached or accessible database 34 to store the group identification data for the wireless devices. A media server 36 can, in one embodiment, be a file management server present on the server-side LAN 30. It should be appreciated that the number of computer components resident on server-side LAN 30, or across the wireless network 20, or Internet generally, are not limited.

The group communication, such as a PTT communication, can be established through a half-duplex channel between the communicating wireless telecommunication device 14,16,18 and the one or more other wireless telecommunication devices of the target set. Also, the group communication server 32 can attempt to bridge the requested direct communication with the target set if at least one of the wireless telecommunication devices of the target set have informed the group communication server 32 of their presence on the wireless network 20.

The group communication server 32 can also inform the wireless telecommunication device 14,16,18 of the inability to bridge a direct communication to the target set 12 upon none of the wireless telecommunication devices (or at least one) of the target set not having informed the group communication server 32 of their presence on the wireless network 20. Further, while the group communication server 32 is shown here as having the attached media server 34 of group identification data, the group communication computer device 32 can have group identity data resident thereupon, and perform all storage functions described herein.

In overview, the system 10 can include at least one wireless communication device, such as mobile telephone 14, that can be a member of a communication group 12 of wireless communication devices. The wireless communication devices in this example can be configured to communicate with each other as a group across a wireless communication network 20. At least one group communication server 32 is configured to store information on communication groups 12 on the wireless communication network 20, the information including the identity of the specific member wireless communication devices of one or more communication groups. The group communication server 32 can be further configured to selectively remove media objects from a data stream from a sending wireless communication device, such as mobile telephone 14, of a communication group 12 such that a target wireless device may download the removed media objects at a later time.

The system 10 can further include a media server 36 in communication with the group communication server 32, with the group communication server 32 configured to send media objects to the media server 36, as is further described herein. The media server 36 can be configured to receive the media objects from the wireless communication device (such as mobile phone 14) and selectively permit members of the communication group 12 for which the notice of removal was sent to access the stored media object across the wireless communication network 20.

For example, in an embodiment of the present disclosure the media object can include, but is not limited to, pictures in JPEG, TIF, and the like, audio files such as MP3, MP4, WAV, and the like, documents, and/or presentations. The media objects can additionally include streaming media, such as a multimedia application (Powerpoint, MOV file, and the like).

The size of the media object files can be very large, and because of the potential delay of sending the media, or inability of the receiving wireless communication device to handle the sent media, the system 10 can use a media server 36 (or file management server) to store the media objects such that target members of the communication group 12 can selectively access the stored media without interrupting other PTT communications. The media server 36 can be configured to send previews of media objects to each of the member wireless devices of the communication group 12 upon establishing a communication link therewith. Alternatively, in one embodiment, if the media objects are stored at the media server 36, the media server 36 can be configured to send a hyperlink to the originating device or the other member wireless communication devices of the communication group 12. The hyperlink in this example can provide a link to the stored group-directed media at the media server 36. Upon receipt of previews for the media objects by at least one of the member wireless devices of the communication group 12, the group communication server 32 can send an acknowledgement indicating to the wireless communication device 14,16,18 that at least one member wireless communication device of the communication group 12 received the media object.

The wireless communication device 14,16,18 can send communication group identification data to the group communication server 32 at the time of requesting the media object to be sent, e.g. a target list, and thus, the media server 36 can be configured to send or store the media object to or for the member wireless communication devices identified in the communication group identification data based upon a variety of criteria as is further discussed herein. Alternately, prior to the wireless communication device sending media objects, the wireless communication device 14,16,18 can request member data for a communication group 12 from the group communication computer device 32, and the group communication server 32 can send one or more addresses or communication group addresses to the wireless communication device 14,16,18. In one embodiment, the communication group computer device 32 can filter the potential communication groups available based upon their member devices' capability to received media objects.

As is further described herein, the wireless communication device 14,16,18 can be engaged in a group communication with the member wireless communication devices of the communication group 12, and send media objects during the group communication in the same communication session, or independently therefrom. Alternately, the media objects can be sent independently of the group-communication session.

Figure 2:
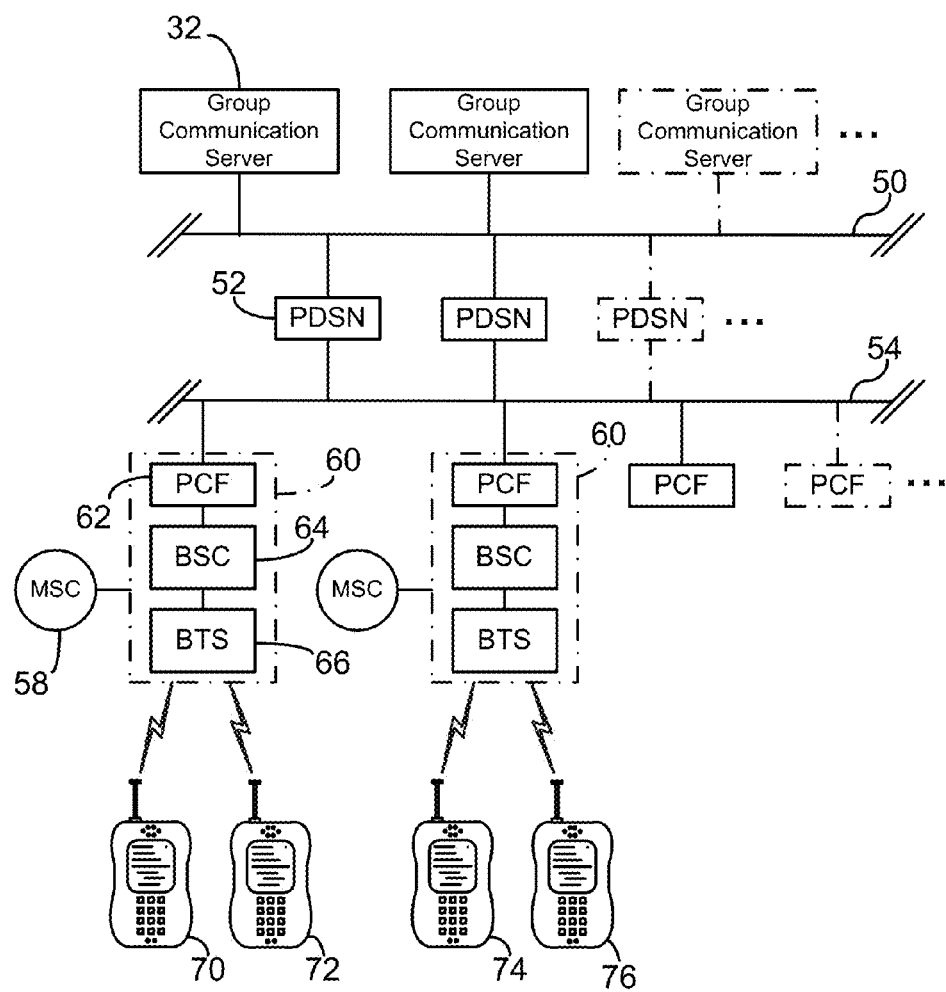
FIG. 2 illustrates an exemplary wireless network in a common cellular telecommunication configuration.

Referring now to FIG. 2, it illustrates an example wireless network in a common cellular telecommunication configuration. The wireless network in this example can include a series of group communication servers 32 that control communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

Continuing with the description of FIG. 2, the group communication server(s) 32 in this example can be connected to a wireless service provider's packet data service node (PDSN) such as PDSN 52, shown here resident on a carrier network 54. Each PDSN 52 can interface with a base station controller 64 of a base station 60 through a packet control function (PCF) 62. The PCF 62 can be located in the base station 60. The carrier network 54 can control messages (generally in the form of data packets) sent to a messaging service controller ("MSC") 58. The carrier network 54 in this example can communicate with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72, 74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (such as depicted by FIG. 1), the wireless communication device can directly connect with the other member of the set and engage in voice and data communication. However, such direct communications will occur through, or at the control of, the group communication computer device 32. All data packets of the devices do not necessarily have to travel through the communication server 32 itself, but the communication server 32 must be able to ultimately control the communication because it will typically be the only server-side component that is aware of and/or can retrieve the identity of the members of the communication group, or direct the identity of the members of the communication group 12 to another computer device.

Figure 3A:
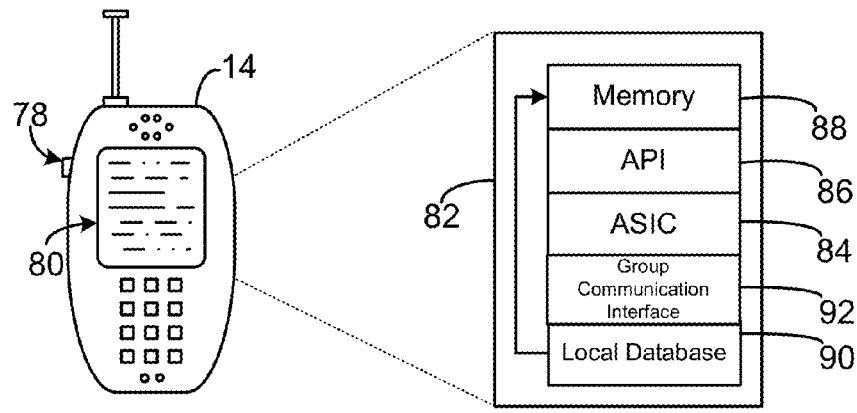
FIG. 3A, illustrates an exemplary mobile computer platform and components that can be a mobile device.

Referring now to FIG. 3A, illustrated is an example wireless telecommunication device that can be a mobile telephone 14 with a PTT button 78 that opens the direct communication to a target device. The wireless device 14 is also shown as having a graphics display 80. The wireless device 14 can include a computer platform 82 that can handle voice and data packets, and receive and execute software applications transmitted across the wireless network 20. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device 14 can be a mobile telephone, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information about the media object in order to generate a preview as is more fully described herein.

In this embodiment the computer platform 82 can also include a group communication interface 92 that can open a group communication channel. The group communication interface 92 can also be part of the standard communication interface for the wireless device which ordinarily carries the voice and data transmitted to and from the wireless device. The group communication interface 92 typically is comprised of hardware as is known in the art.

Figure 3B:
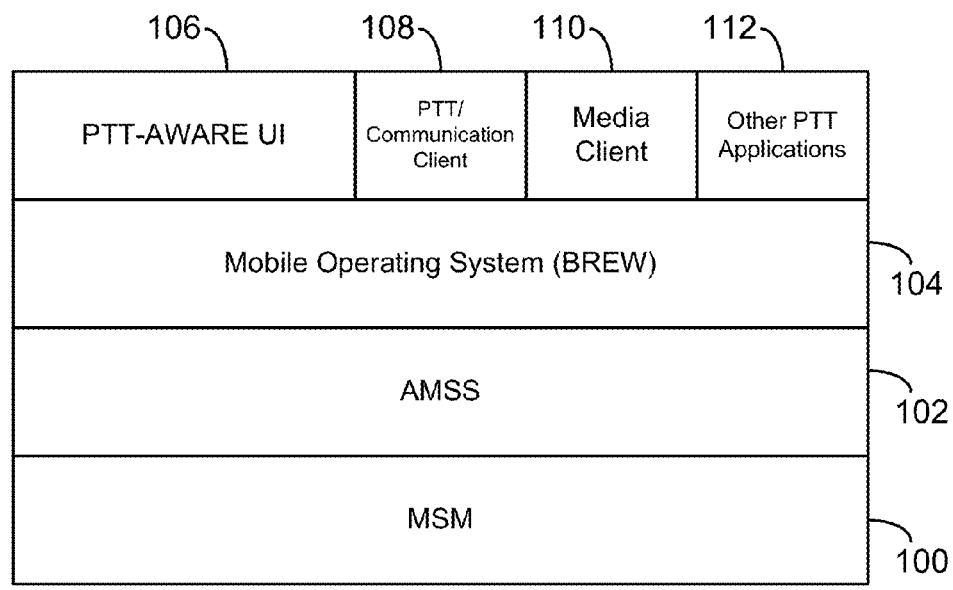
FIG. 3B, illustrates exemplary software layers resident on the computer platform of FIG. 3A.

Continuing with the description of FIGS. 3A-3B, additionally depicted is a diagram of one embodiment of the software layers of the group application client that can include, but is not limited to, PTT functionality and media object functionality. In this embodiment, the computer platform 82 in the mobile device environment can include a series of software "layers" developed on top of the Mobile Station Modem (MSM) 100 and the Advanced Mobile Subscriber Software (AMSS) 102, developed by QUALCOMM®. In this example the underlying MSM chipset can implement the software protocol stack for the entire suite of CDMA communication technologies that include CDMA2000 1X and CDMA2000 1xEV-DO. In this example the AMSS can be configured to support a mobile operating system layer 104, which in this embodiment is BREW, also developed by QUALCOMM®. The mobile operating system layer 104 can provide an application programming interface for chip or device-specific operations, while providing an isolation layer that eliminates direct contact to the AMSS 100 and any OEM software on the computer platform. The mobile operating system layer 104 can enable application development that uses mobile device features without having to rewrite the application each time a new release of the device-specific software is released.

In this example the mobile operating system 104 can include a PTT client 108 that is configured to offer access to PTT services through an external interface, here shown at a PTT-aware UI 106. The PTT/Communication Client 108 can include all the functions required to enable mobile operating system 104 applications, such as the Media Client 110. In this embodiment, the PTT/Communication Client 108 can maintain access to PTT services, responds to communication requests, process all PTT-aware mobile operating system applications requests for PTT services, process all outgoing PTT requests, collect and package vocoder packets for originating PTT talk spurts, and parses packets of vocoder data for terminated PTT talk spurts.

The media client 110 in this example can be a mobile operating system-based application that extends PTT services for access to media types other than the traditional half duplex voice communications (VoIP-PTT media). The media client 110 can provide access to media services through an external interface such as a media aware API that is an application that may be developed entirely as a mobile operating system-based application or used in combination with an AMSS 102 interface. The group media aware UI can respond to user requests for media services by invoking the appropriate APIs, such as those from other resident PTT and group media applications 112. The media client 110 can service the request from the user and inform the user the result of any group-directed media request. The media client 110 can additionally be configured to handle incoming notifications that indicate there is media object to download from the file management server (data store 36). For example, the media client 110 can be configured in one embodiment to download media objects immediately or in other embodiments the media client 110 can be configured to download the media object at a predetermined time period, e.g., at 10:00 pm daily, or it can be configured to prompt the user via the PTT UI 106 to determine whether and/or when to download the file. The specific usage of the PTT/Communication client 108 is shown only for illustration, as the media client 110 can utilize whatever communication interface is present at the mobile device for communication, in either software, hardware or virtual form. Furthermore, the PTT/Communication client 108 can instruct or utilize other resident systems, either in hardware, firmware, or software, to perform the functions stated herein.

Figures 4, 5:
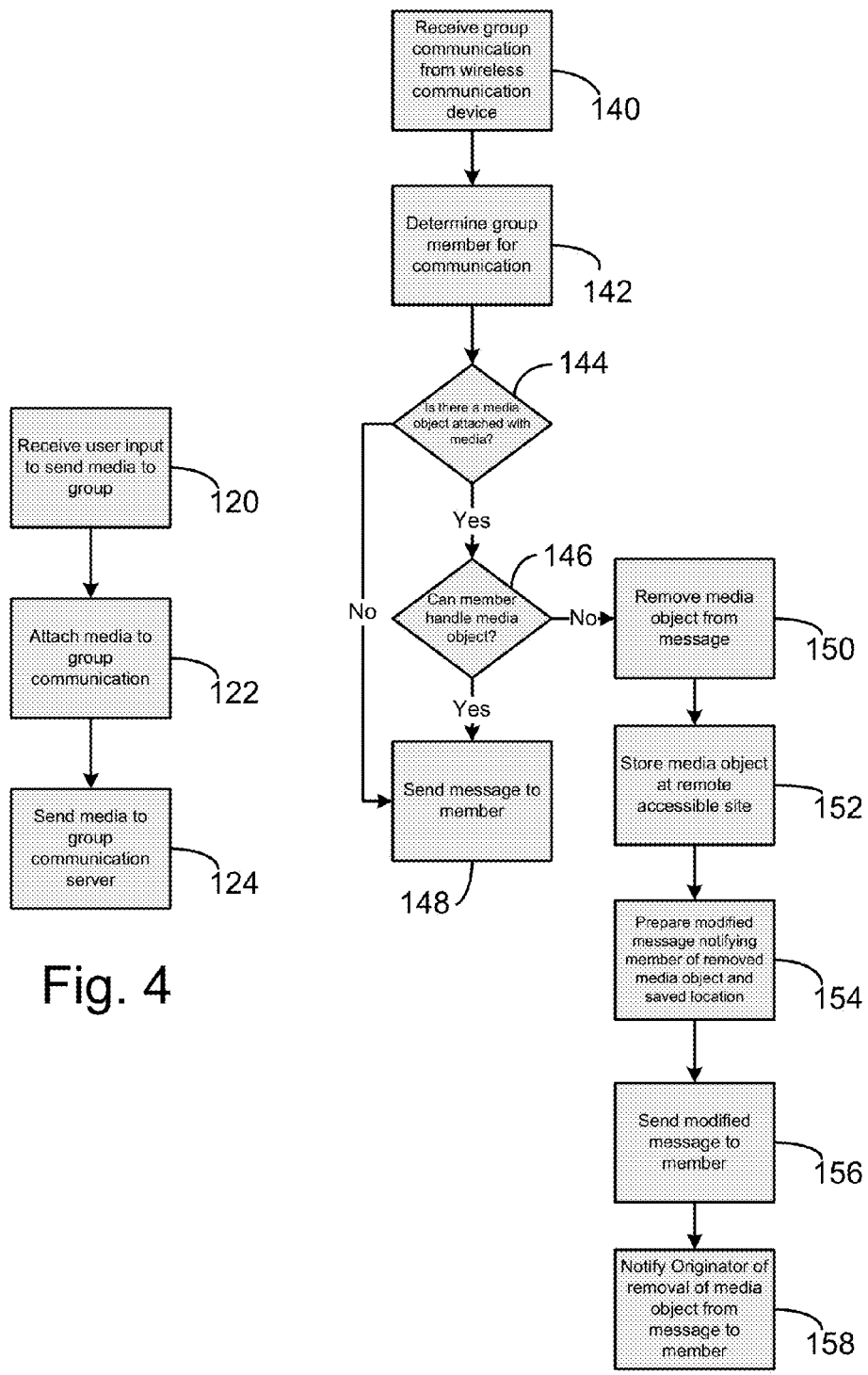
FIG. 4 illustrates an exemplary operational process for an originating wireless communication device to send a group communication with a media.
FIG. 5 illustrates an exemplary operational process for a group communication server selectively handling the group communication including media and removing any media object for a target group member that is unhandleable by the group member.

Referring now to FIG. 4, an embodiment of the method for selectively removing a media object during a group communication with an originating wireless communication device 14,16,18 and one or more target wireless communication devices across a wireless communication network 20. The present method can be commenced prior to the instantiation of the group communication session, at the time of the group setup, or during the session. The user of the wireless communication device 14,16,18 inputs a media object to send to another device of the communication group 12, as shown at step 120, and then attaches the media object to the group communication, as shown at step 122. This "attachment" can be insertion of data within a half-duplex communication spurt, attached to other data or voice, or can be a separate object therefrom. The media object is then sent from the originating wireless communication device to one or more target wireless communication devices across a wireless communication network 20, the group communication including one or more media objects (which can be discretely discerned in the data), as shown at step 124. The media object will be discrete data such that the media object can be identified within the group communication stream, either as a separate attached file or a separate communication (possibly being separate communication packets) within the group communication data.

Referring now to FIG. 5, there is illustrated one embodiment of the group communication server 32 receiving the group communication from the wireless communication device 14,16,18. The group communication server 32 which control group communications between a group 12 of member wireless communication devices received a group communication from wireless communication device 14,16,18 as shown at step 140 and then the group communication server 32 determines the one or more group member wireless communication devices that the group communication is intended for, as shown at step 142. A determination is then made as to whether there is a media object in the media, representing a data object, as shown at decision 144. If there is not a media object attached at decision 144, then the message is sent to the member of the communication group 12, as shown at step 148.

Otherwise, if there is a media object attached at decision 144, then a determination is made as to whether the intended member for the media object can handle the media object, as shown at decision 146. The group communication server 32 can be aware of the capabilities of the member based upon stored information on the device, or can request information from the member device on its capabilities prior to sending the message, as shown as performed by the DCH 134 in FIG. 6. If the member device can handle the media object at decision 146, then the message will be sent to the member, as shown at step 148 with not alteration or changes to the media object or message. Otherwise, if the member cannot handle the media object at decision 146, then the media object is removed from the group communication message, as shown at step 150, and in one embodiment, the media object is then stored at another location accessible to the wireless communication device 14,16,18, as shown at step 152. The storage could be, for example, in the media server 36 such that the member wireless communication device 14,16,18 could later access the stored media should it be able to handle it. Then the group communication server 32 prepares a modified message, possibly notifying the member of the removed media object and also including the saved location of the media, such as hyperlink or web address, as shown at step 154 and then the modified message is sent to the member wireless communication device 14,16,18 as shown at step 156.

In one embodiment, the media server 36 can then send on the wireless communication network 20 through the group communication server 32 to the at least one target wireless communication device 14,16,18 the media object containing the one or more media objects, as well as storing the media object such that the at least one target wireless communication device 14,16,18 can selectively retrieve the stored media object upon the target wireless communication device 14,16, 18 being able to handle the one or more media objects held within the stored media object. Then, in this embodiment, the originator of the media object is notified that the media object was removed, either through a standard message that a media object was removed, or can provide a customized message of what was removed and/or its stored location, as shown at step 158.

In one embodiment, the group communication server 32 can store information on the media-handling capability of each of the wireless communication device members of a communication group 12 itself, or can access the information from another computer device across the wireless communication network 20 that stores information on the media-handling capability of each of the wireless communication device members of a communication group 32.

Figure 6:
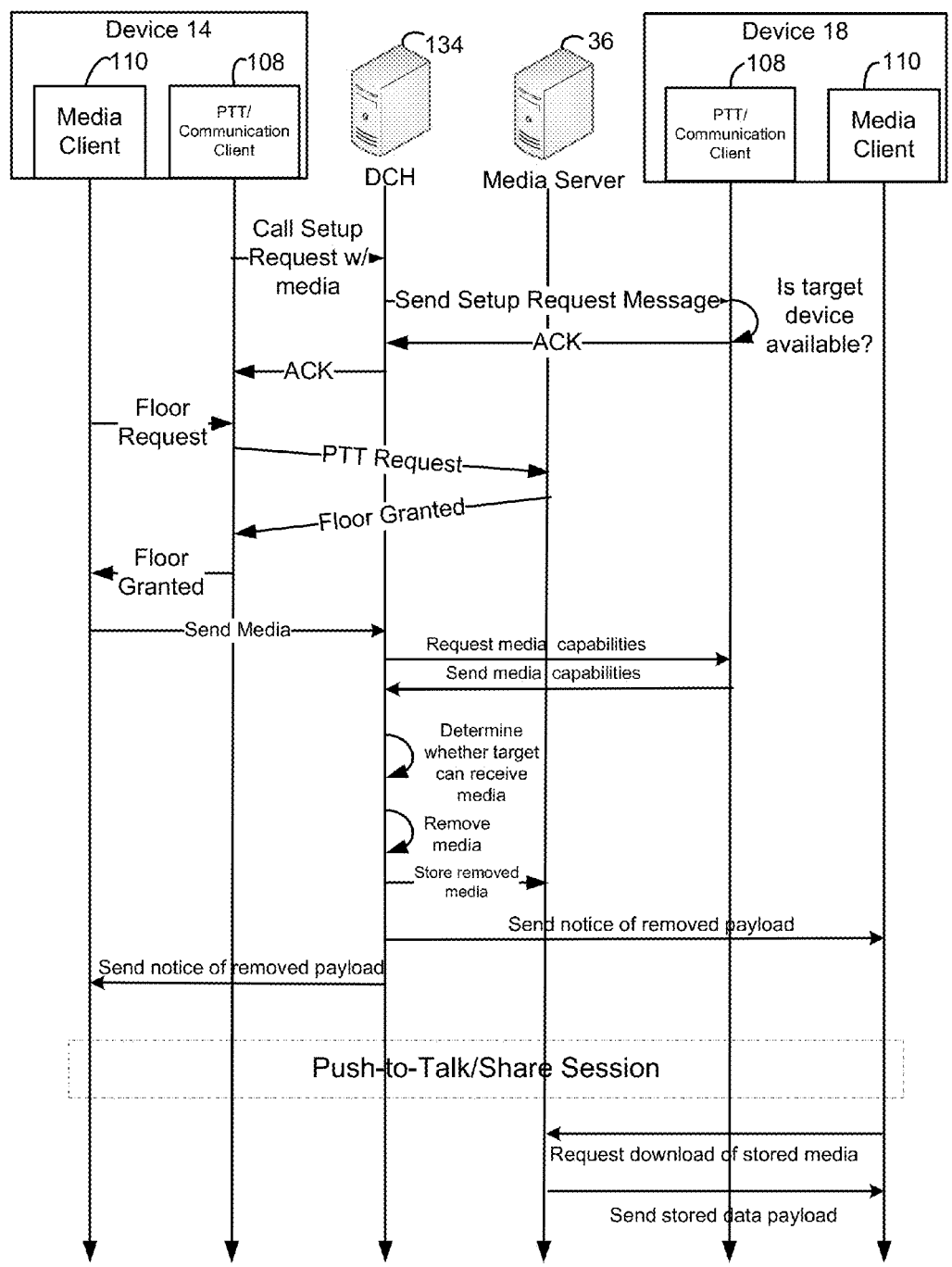
FIG. 6 illustrates an exemplary call flow for establishing a push-to-talk session and transmitting a media object that is unhandleable by a target member.

Referring now to FIG. 6, there is illustrated one embodiment of a call flow diagram for selectively removing the media object from half-duplex communication of the media in a push-to-talk session. The usage of a PTT session is only illustrative and any group communication session that is created between devices can be utilized. For example, the user of the device 14 may determine that they want to engage in a PTT conversation with a user of a target device 18 and request a push-to-talk session and also send media to the communication group 12. A PTT session can be established by the PTT/Communication client 108 by selecting a contact from an address book and pressing the PTT button 78 of FIG. 3A. In one embodiment, the PTT/Communication client 108 can receive an indication of the selection and send a call setup request message to a dispatch call handler (DCH) 134. Here, the DCH 134 serves as a group communication server 32, but one or more servers can alternately handle the setup of the group communication. Here, the call setup request can contain, for instance, the target device's address, the media objects desired sent, and information that identifies the media server 36 that stores media for the mobile device 14. The call setup request may also be sent with a DataOverSignaling (DoS) Access channel message, or other signaling messages in various formats such as Short Data Burst (SDB) messages can likewise be utilized. In an example embodiment, the DCH 134 can be configured to perform the PTT call setup functions, including locating the target, applying call restrictions, selecting a vocoder and location and/or assign a media server 36 to handle storing any media objects uploaded during the PTT session.

Once the device 14 is granted the floor in the PTT session with the PTT/Communication client 108 having an outgoing channel open, the media client 110 can send media to the DCH 134 and the DCH 134 will determine if the target device 18, and more specifically, the media client 110 of the target device 18, can handle the media. Here, the DCH 134 is shown as requesting and receiving media capabilities from the target device 18. If the target device 18 is unable to handle the media, the DCH removes the media and stores it at the media server 36. The target device 18, and media client 110 (or this can be the PTT/Communication client 108) can be notified of the removal by the DCH 134. Additionally, notice can be given to the originating device 14 that the media object was removed from the message. After the PTT or push-to-share session has ended, the media client 110 can retrieve the removed media object that is stored at the media server 36 if the target client 18 has become able to handle the media.

Other devices on the wireless network 20 can likewise perform some or all of the functionality described herein as executed on the DCH 134. Furthermore, the media client 110 can alternately direct other modules on the device to send and receive media, or can send instructions to other devices to implement the present system and method. For example, the media client 110 can only send an instruction to the media server 36 to send stored media to the target device 18. Likewise, the media client 110 and the target device 18 can likewise instruct another module resident on the platform 82 of the target device 18 to perform a task, such as retrieving media from the media server 36. Thus, in one embodiment, the present method can be carried out through instructions from the media clients 110.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually, in firmware, or virtually any combination thereof or collectively, by a wide range of hardware, software media.

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of a server, or can be in a connective database. Further, the computer readable medium can be in a secondary storage media that is loadable onto a communication device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored as one or more instructions or code on a non-transitory computer-readable medium. Non-transitory computer-readable media includes both computer storage media including any medium that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A system for selectively removing one or more media objects from a group communication from an originating wireless communication device and one or more target wireless communication devices across a wireless communication network, comprising:
    an originating wireless telecommunication device configured to selectively send a group communication to one or more target wireless communication devices across a wireless communication network, the group communication including one or more discrete media objects; and
    a group communication server configured to control group communications between a group of member wireless communication devices, and further configured to determine a media-handling capability of one or more wireless communication device members of a communication group,
    wherein the group communication server is configured such that upon a determination that a media object sent from an originating wireless communication device to at least one target wireless communication device is unable to be handled by the at least one target wireless communication device, the group communication server removes the media object from the group communication and notifies the at least one target wireless communication device and the originating wireless communication device of the removal of the media object.

2. The system of claim 1, wherein the one or more media objects is sent from another computer device on the wireless communication network through the group communication server to the at least one target wireless communication device.

3. The system of claim 2, wherein the other computer device on the wireless communication network is configured to store the media object such that the at least one target wireless communication device can selectively retrieve the stored media object upon the target wireless communication device being able to handle the media object.

4. The system of claim 3, wherein the group communication server is further configured to provide a link to the stored media object to the at least one target wireless communication device.

5. The system of claim 1, wherein the group communication server is further configured to notify the at least one target wireless communication device of a type of the media object that was removed.

6. The system of claim 1, wherein the group communication server is further configured to request media-handling capabilities from the at least one target wireless communication device.

7. The system of claim 1, wherein the group communication server is further configured to store information on the media-handling capability of each of the wireless communication device members of a communication group.

8. The system of claim 1, further comprising another computer device on the wireless communication network configured to store information on the media-handling capability of each of the wireless communication device members of a communication group, and wherein the group communication server is further configured to retrieve the information on the media handling capability of the at least one target wireless communication device upon receiving a group communication containing one or more media objects intended for the at least one target wireless communication device.

9. A system for selectively removing one or more media objects from a group communication from an originating wireless communication device and one or more target wireless communication devices across a wireless communication network, comprising:
an originating wireless telecommunication means for selectively sending a group communication to one or more target wireless communication devices across a wireless communication network, the group communication including one or more discrete media objects; and
a group communication means for controlling group communications between a group of member wireless communication devices, the group communication means further comprising:
means for determining a media-handling capability of one or more wireless communication device members of a communication group;
means for removing the media object from the group communication upon a determination that at least one of the one or more target wireless communication device is unable to handle the media object sent from the originating wireless telecommunication means; and
means for notifying the at least one target wireless communication device and the originating wireless telecommunication means of the removal of the media object.

10. A group communication computer device comprising a computer platform configured with software instructions to perform operations comprising:
controlling group communications between a group of member wireless communication devices on a wireless communication network, wherein at least one group communication is received from an originating wireless telecommunication device and sent to one or more target wireless communication devices with the group communication including one or more discrete media objects;
determining a media-handling capability of one or more wireless communication device members of a communication group;
determining whether a media object sent from an originating wireless communication device to at least one target wireless communication device is unable to be handled by the at least one target wireless communication device;
removing the media object from the group communication when it is determined that the at least one target wireless communication device is unable to handle the media object sent from the originating wireless communication means; and
notifying the at least one target wireless communication device and the originating wireless telecommunication device of the removal of the media object.

11. The group communication computer device of claim 10, wherein the one or more media objects is sent from another computer device on the wireless communication network through the group communication computer device to the at least one target wireless communication device.

12. The group communication computer device of claim 10, wherein the computer platform is configured with software instructions to perform operations further comprising:
providing, to the at least one target wireless communication device, a link to a stored media object, wherein the stored media object is stored on another computer device on the wireless communication network is configured to store the media object such that the at least one target wireless communication device can selectively retrieve the stored media object upon the target wireless communication device being able to handle the media object.

13. The group communication computer device of claim 10, wherein the computer platform is configured with software instructions to perform operations further comprising:
requesting media-handling capabilities from the at least one target wireless communication device.

14. The group communication computer device of claim 10, wherein the computer platform is configured with software instructions to perform operations further comprising:
storing information on the media-handling capability of each of the wireless communication device members of a communication group.

15. The group communication computer device of claim 10, wherein the computer platform is configured with software instructions to perform operations further comprising:
retrieving information on the media-handling capability of the at least one target wireless communication device upon receiving a group communication containing one or more media objects intended for the at least one target wireless communication device, wherein the information on the media-handling capability of the at least one target wireless communication device is stored on another computer device on the wireless communication network.

16. A group communication computer device, comprising:
means for controlling group communications between a group of member wireless communication devices on a wireless communication network, wherein at least one group communication is sent from an originating wireless telecommunication device to one or more target wireless communication devices with the group communication and the at least one group communication includes one or more discrete media objects;
means for determining a media-handling capability of one or more wireless communication device members of a communication group;
means for removing one or more media objects from the group communication upon a determination that a media object sent from an originating wireless communication device to at least one target wireless communication device is unable to be handled by the at least one target wireless communication device; and
means for notifying the originating wireless communication device of a removal of the media object.

17. A method for selectively removing one or more media objects from a group communication from an originating wireless communication device and one or more target wireless communication devices across a wireless communication network, comprising:
controlling group communications between a group of member wireless communication devices on a wireless communication network, wherein at least one group communication is sent from an originating wireless telecommunication device to one or more target wireless communication devices with the group communication including one or more discrete media objects;
determining a media-handling capability of one or more target wireless communication device members of a communication group;
removing a media object from the group communication upon a determination that the media object sent from an originating wireless communication device to at least one target wireless communication device is unable to be handled by the at least one target wireless communication device; and notifying the originating wireless communication device of the removal of the media object.

18. The method of claim 17, further comprising:
notifying the target wireless communication device of the removal of the media object; and
transmitting the removed media object to another computer device on the wireless communication network in a manner that enables the other computer device to store the removed media object so that the at least one target wireless communication device can selectively retrieve the stored media object from the other computer device upon the target wireless communication device being able to handle the media object.

19. The method of claim 18, further comprising configuring the group providing a link to the media object stored on the other computer device to the at least one target wireless communication device.

20. The method of claim 19, further comprising notifying the at least one target wireless communication device of a type of the media object that was removed.

21. The method of claim 19, further comprising notifying the at least one target wireless communication device with a standard message that a media object was removed.

22. The method of claim 17, further storing information on the media-handling capability of each of the wireless communication device members of a communication group.

23. The method of claim 17, further comprising:
transmitting information on the media-handling capability of each of the wireless communication device members of a communication group to another computer device on the wireless communication network for storage on the other computer device; and
retrieving the information on the media-handling capability of the at least one target wireless communication device upon receiving a group communication containing one or more media objects intended for the at least one target wireless communication device.

24. A non-transitory computer-readable medium having stored thereon computer-executable instructions configured to cause a processor to perform operations comprising:
controlling a group communication received from an originating wireless communication device and sent to one or more target wireless communication devices across a wireless communication network, the group communication including one or more discrete media objects;
determining a media-handling capability of one or more target wireless communication device members of a communication group;
removing a media object from the group communication upon a determination that the media object sent from the originating wireless communication device to at least one target wireless communication device is unable to be handled by the at least one target wireless communication device; and
notifying the at least one target wireless communication device and the originating wireless device of the removal of the media object.

25. The non-transitory computer-readable medium of claim 24, wherein the stored computer-executable instructions are configured to cause the processor to perform operations further comprising:
transmitting the removed media object to another computer device on the wireless communication in a manner that enables the other computer device to store the removed media object so that the at least one target wireless communication device can selectively retrieve the stored media object from the other computer device upon the target wireless communication device being able to handle the media object.

26. The non-transitory computer-readable medium of claim 25, wherein the stored computer-executable instructions are configured to cause the processor to perform operations further comprising:
providing a to the stored media object to the at least one target wireless communication device.

27. The non-transitory computer-readable medium of claim 24, wherein the stored computer-executable instructions are configured to cause the processor to perform operations further comprising:
notifying the at least one target wireless communication device of a type of the media object that was removed.

28. The non-transitory computer-readable medium of claim 24, wherein the stored computer-executable instructions are configured to cause the processor to perform operations further comprising:
storing information on the media-handling capability of each of the wireless communication device members of a communication group.

29. The computer readable product non-transitory computer-readable medium of claim 24, wherein the stored computer-executable instructions are configured to cause the processor to perform operations further comprising:
transmitting information on the media-handling capability of each of the wireless communication device members of a communication group to configuring another computer device on the wireless communication network in a manner that enables the other computer device to store the information on the media-handling capability of each of the wireless communication device members of a communication group; and
retrieving the information on the media-handling capability of the at least one target wireless communication device upon receiving a group communication containing one or more media objects intended for the at least one target wireless communication device.

* * * * *